3,092,606
FLAME-RESISTANT UNSATURATED POLYESTER-VINYLIDENE MONOMER REACTION PRODUCT CONTAINING THE DIMETHYL ESTER OF 2-HYDROXYISOPROPYL-PHOSPHONIC ACID
Heinrich Ruppert, Krefeld, Hermann Schnell, Krefeld-Urdingen, and Leonhard Goerden, Oedt, Germany, assignors to Farbenfabriken Bayer Aktiengesellschaft, Leverkusen, Germany, a corporation of Germany
No Drawing. Filed Sept. 28, 1959, Ser. No. 842,619
Claims priority, application Germany Sept. 30, 1958
1 Claim. (Cl. 260—45.4)

This invention is concerned with flame-resistant, self-extinguishing plastics and with a process for their production.

It is known that difficultly inflammable self-extinguishing plastics can be produced by polymerizing unsaturated halogen-containing polyesters with polymerizable vinyl compounds with the addition of phosphorus compounds in the presence of catalysts.

As phosphorus compounds which increase the flame resistance, there have hitherto particularly been used triethyl phosphate, tri-β-chloroethyl phosphate, triallyl phosphate, triphenyl phosphate, tricresyl phosphate, the allyl esters of phenyl phosphonic acid and of chloromethyl phosphonic acid, as well as tris-(hydroxymethyl)-phosphine oxide.

However, some of these phosphorus compounds, such as the esthers of ortho-phosphoric acid are toxic and this restricts their use in the production of self-extinguishing plastics. Other phosphorus compounds, such as the allyl esters, require laborious processes for their production or, as in the case of tris-(hydroxymethyl)-phosphine oxide, require the use in their production of the exceptionally poisonous gas, phosphine. In order to impart sufficient flame resistance to chlorine-containing unsaturated polyesters, larger amounts of the compounds mentioned must be added when the chlorine content of the polyester is low, which disadvantageously influences the physical properties of the end product, or the chlorine-containing polyester itself must possess a high chlorine content.

We have now, surprisingly, found that flame-resistant self-extinguishing plastics are obtained, even in the case of polyesters with a comparatively low halogen content, when, to mixtures of polymerizable, ethylenically unsaturated halogen-containing polyesters with monomeric polymerizable compounds containing the polymerizable vinylidene group $CH_2=C<$, are added, before or during the hardening operation, hydroxyalkyl-phosphonic acid dialkyl esters of the general formula:

$$\begin{array}{c} R_1 \quad\quad\quad OR_3 \\ \diagdown\quad\quad\diagup \\ C\!\!-\!\!-\!\!P \\ \diagup\;\;|\quad\;\;\|\diagdown \\ R_2\;OH\;\;O\quad OR_3 \end{array}$$

in which $R_1$, $R_2$, and $R_3$ may be a saturated or unsaturated, unbranched or branched aliphatic hydrocarbon radical with 1 to 5 carbon atoms and $R_1$ and $R_2$ can also be hydrogen atoms.

These compounds, which have to be added to the mixtures in amounts from about 1 to about 10 percent by weight, are very easily obtainable by known processes. They are formed in good yields, for example, by the addition of catalytic amounts of sodium methylate to a mixture of a dialkyl phosphite and a ketone. Furthermore, in contradistinction to many other phosphorus compounds, they are not toxic.

Hydroxy-alkyl-phosphonic acid dialkyl esters within the meaning of the present invention are, for example, Hydroxy-methyl-phosphonic acid dimethyl ester ($R_1$ and $R_2$=hydrogen, $R_3$=methyl),
Hydroxy-methyl-phosphonic acid dibutyl ester ($R_1$ and $R_2$=hydrogen, $R_3$=butyl),
Hydroxy-methyl-phosphonic acid diamyl ester ($R_1$ and $R_2$=hydrogen, $R_3$=amyl),
1-hydroxy-ethyl-phosphonic acid dimethyl ester ($R_1$=hydrogen, $R_2$ and $R_3$=methyl),
2-hydroxy-isopropyl-phosphonic acid dimethyl ester ($R_1$, $R_2$, and $R_3$=methyl),
1-hydroxy-1-vinyl-ethyl-phosphonic acid dimethyl ester ($R_1$ and $R_3$=methyl, $R_2$=vinyl),
1-hydroxy-ethyl-phosphonic acid diamyl ester ($R_1$=hydrogen, $R_2$=methyl, $R_3$=amyl),
2-hydroxy-isopropyl-phosphonic acid diallyl ester ($R_1$ and $R_2$=methyl, $R_3$=allyl),
2-hydroxy-isopropyl-phosphonic acid di-isoamyl ester ($R_1$ and $R_2$=methyl, $R_3$=isoamyl),
2-hydroxy-isopropyl-phosphonic acid, 1,2-ethylene glycol ester ($R_1$ and $R_2$=methyl, both $OR_3$ radicals taken taken together form a ring of the structure $$-OCH_2CH_2O-),$$

1-hydroxy-2-methyl-propyl-phosphonic acid diethyl ester ($R_1$=hydrogen, $R_2$=isopropyl, $R_3$=ethyl),
1-hydroxy-1-vinyl-ethyl-phosphonic acid dibutyl ester ($R_1$=methyl, $R_2$=vinyl, $R_3$=butyl),
1-hydroxy-1-isopropenyl-ethyl-phosphonic acid dimethyl ester ($R_1$=methyl, $R_2$=isopropenyl, $R_3$=methyl), and
1-methyl-1-hydroxypropylphosphonic acid diethyl ester ($R_1$=methyl, $R_2$ and $R_3$=ethyl).

The hydroxyalkyl phosphonic acid dialkyl esters, such as 2-hydroxyisopropyl-phosphonic acid dimethyl ester, produced from ketones with a low carbon content, are particularly suitable.

Unsaturated halogen-containing polyesters within the meaning of the present invention are polycondensation products which are produced, as well known in the art, for example, from polyhydric alcohols such as ethylene glycol, diethylene glycol, propylene glycol, dipropylene glycol, butanediol-1,4, butanediol-1,3, butanediol-1,2, pentanediol-1,4, pentanediol-1,5, hexanediol-1,6, glycerol, trimethylol ethane, trimethylol propane, trimethylol butane, pentaerythritol, dipentaerythritol and sorbitol, and the like, ethylenically unsaturated polycarboxylic acids such as maleic, fumaric, aconitic and itaconic and the like, and possibly also dicarboxylic acids which are free of non-benzenoid unsaturation, such as phthalic, malonic, succinic, glutaric, adipic, sebacic, and the like, one or more of these constituent compounds being halogenated. As constituent components of that kind there may be mentioned, for example, bromo-fumaric acid, chloro-fumaric acid, bromo-maleic acid, chloro-maleic acid, dibromo-maleic acid, chloromaleic anhydride, dibromo-maleic anhydride, dichloro-maleic anhydride, bromo-malonic acid, chloro-malonic acid, dibromo-malonic acid, bromo-succinic acid, α,β-dibromo-succinic acid, α,β-diiodo-succinic acid, α,β-dichloro-succinic acid, α,β-dichloro-succinic anhydride, 3-bromo-phthalic acid, 4-chloro-phthalic acid, 3,4-dibromo-phthalic acid, 3,6-dichloro-phthalic acid, tetrachloro-phthalic acid, 3-bromo-phthalic anhydride, 4-chloro-phthalic anhydride, 3,6-dibromo-phthalic anhydride, 3,6-dichloro-phthalic anhydride, 4,5-dichloro-phthalic anhydride, tetrachloro-phthalic anhydride, dibromo-sebacic acid, hexachloroendomethylene tetrahydrophthalic acid, and the like, furthermore halogenated polyhydric alcohols such as 3,4-dibromo-3-chloro-1,2-butanediol, 2,3-dibromo-1,4-butanediol, 1,4-dichloro-2,3-butanediol, 1,4-diiodo-2,3-butanediol, 5-chloro-1,2-pentanediol, 1,5,5,5-tetrachloro-1,3-pentanediol, 2-chloro-1,5-pentanediol, and the like.

Monomeric polymerizable compounds containing the polymerizable group $CH_2=C<$ are, for example, styrene, side-chain alkyl and halogen-substituted styrenes such as α-methyl styrene, α-chlorostyrene, α-ethylstyrene, and the like, or substituted in the ring by alkyl or halogen radicals, styrenes such as o-, m-, and p-alkyl styrenes such as o-methyl-styrene, p-ethylstyrene, m-propylstyrene, 2,4-dimethylstyrene, 2,5-diethylstyrene, bromostyrene, chlorostyrene, dichlorostyrene, and the like. Still further, one can make use of the allyl compounds such as diallyl phthalate, tetrachlorodiallyl phthalate, allyl alcohol, methallyl alcohol, allyl acetate, allyl methacrylate, diallyl carbonate, allyl lactate, allyl α-hydroxy-isobutyrate, allyl trichlorosilane, allyl acrylate, diallyl malonate, diallyl oxalate, diallyl gluconate, diallyl adipate, diallyl sebacate, diallyl citraconate, the diallyl ester of muconic acid, diallyl itaconate, diallyl chlorophthalate, diallyl dichlorosilane, the diallyl ester of endomethylene tetrahydrophthalic acid anhydride, the diallyl ester of tetrachloroendomethylene tetrahydrophthalic acid anhydride, triallyl tricarballylate, triallyl aconitate, triallyl cyanurate, triallyl citrate, triallyl phosphate, trimethallyl phosphate, tetraallyl silane, tetraallyl silicate, hexallyl disiloxane, and the like.

The halogen content of the mixtures generally may amount from about 5 to about 30 percent by weight.

The hydroxyalkylphosphonic acid dialkyl esters which may be used according to the present invention dissolve readily in the above-mentioned polyester resins and mixtures thereof with monomers. They are quite compatible therewith, do not influence the polymerization with peroxides at elevated temperatures and bring about no discoloring during the polymerizing of the polyester mixtures with, for example, benzoyl peroxide, succinyl peroxide, acetyl peroxide, perbenzoic acid, peracetic acid, anisoyl peroxide, toluyl peroxide, p-bromobenzoyl peroxide, furoyl peroxide, cyclohexanone peroxide, and chloracetyl peroxide or any organic ozonide, such as diisopropylene ozonide, diisobutylene ozonide, or a mixture of such substances. The polymerization products are transparent and remain unaltered after immersion for several weeks in water. The mechanical properties of moulded materials obtained are not influenced by the addition of the phosphorus compounds used according to the present invention.

The following examples are given for the purpose of illustrating the present invention:

*Example 1*

A polyester resin is produced in known manner from 140 parts by weight maleic acid anhydride, 158 parts by weight phthalic acid, 414 parts by weight hexachloroendomethylene-tetrahydrophthalic acid, 88 parts by weight glycol and 200 parts by weight 1,3-butane diol, and dissolved in styrene at a ratio of 70:30 to a solution with a chlorine content of about 18 percent, 4 percent of a 50 percent suspension of benzoyl peroxide in dibutyl phthalate are added to the resin as catalyst. The mixture is divided into 4 parts. Plates having a thickness of 2 millimeters are coated in known manner with each part, the first without addition and the others, on the other hand, after the addition thereto of 3 percent, 5 percent and 7 percent respectively of 2-hydroxyisopropyl-phosphonic acid dimethyl ester. The testing of the plates according to ASTM 635–44 gave the following results:

(1) The plate extinguished after 2 minutes.
(2) The plate extinguished after 19 seconds.
(3) The plate extinguished after 7 seconds.
(4) The plate extinguished after 2 seconds.

*Example 2*

One proceeds in the manner described in Example 1. As phosphorus compound there is added to the polyester resin 3 percent, 5 percent and 7 percent respectively of 1-hydroxyethyl-phosphonic acid dimethyl ester. The following results were obtained by ASTM 635–44:

(1) Sheet without additive extinguishes after 2 minutes.
(2) Sheet with 3 percent additive extinguishes after 19 seconds.
(3) Sheet with 5 percent additive extinguishes after 11 seconds.
(4) Sheet with 7 percent additive extinguishes after 4 seconds.

*Example 3*

An unsaturated halogen-containing polyester produced in a manner well known in the art from 178 parts by weight tribromophenyl glycidyl ether [1-(2,3-epoxypropoxy)tribromobenzene], 89.5 parts by weight phthalic acid, 212 parts by weight maleic acid anhydride and 147 parts by weight ethylene glycol, is dissolved in styrene at a ratio of 70:30. The bromine content of this solution is about 13.2 percent. 4 perecnt of a 50 percent suspension of benzoyl peroxide in dibutyl phthalate are added to the resin as catalyst. Furthermore 5 percent 2-hydroxy-isopropyl-phosphonic acid dimethyl ester are added before hardening.

From the mixture a plate having a thickness of 2 millimeters is cast. The testing of the plate according to ASTM 635–44 gives an extinguishing time of 1 second.

*Example 4*

It is surprising that the times required for self-extinguishing (according to ASTM 635–44) of halogen-containing plastics which have been produced according to the present invention with the addition of hydroxyalkylphosphonic acid dialkyl esters are considerably shorter than the times required for the self-extinguishing of halogen-containing polyesters produced with the addition of other phosphorus compounds.

One proceeds in the manner described in Example 1. The phosphorus compounds added are given in the following table:

| Additive | Amount added, percent | Time for self-extinguishing by ASTM 635–44 (seconds) |
| --- | --- | --- |
| 2-hydroxyisopropylphosphonic acid dimethyl ester | 5 | 7 |
| 1-hydroxyethyl-phosphonic acid dimethyl ester | 5 | 11 |
| 2-hydroxyisopropylphosphonic acid diallyl ester | 5 | 15 |
| 1-hydroxy-1-vinyl-ethyl-phosphonic acid dimethyl-ester | 5 | 17 |
| 1-methyl-1-hydroxypropylphosphonic acid diethyl ester | 5 | 16 |
| 1-hydroxy-methyl-phosphonic acid diamyl ester | 5 | 18 |
| Triethyl phosphate | 5 | 21 |
| Tri-β-chloroethyl phosphate | 5 | 30 |
| Triallyl phosphate | 5 | 37 |
| Tri-(2,3-dibromopropyl)-phosphate | 5 | 43 |
| Triphenyl phosphate | 5 | 45 |
| Tricresyl phosphate | 5 | 48 |
| Dichlorovinyl-phosphonic acid diethyl ester | 5 | 26 |
| β-chloroethyl-phosphonic acid di-β-chloroethyl ester | 5 | 32 |

We claim:

A flame-resistant, self-extinguishing plastic having a halogen content between about 5 and about 30 percent by weight of the plastic consisting of a polymerized mixture of (a) a polymerizable, ethylenically unsaturated, halogen-substituted polyester condensation product of a polyhydric alcohol and a polycarboxylic acid and (b) a polymerizable monomeric compound containing the vinylidene radical, which mixture had been polymerized in the presence of a peroxide catalyst, the said polymerizable mixture containing the dimethyl ester of 2-hydroxyisopropylphosphonic acid in an amount equivalent to between about 1 and about 10 percent by weight of the plastic.

References Cited in the file of this patent

UNITED STATES PATENTS

| | | |
|---|---|---|
| 2,579,810 | Fields | Dec. 25, 1951 |
| 2,824,085 | Cummings | Feb. 18, 1958 |
| 2,877,204 | Duhnkrack et al. | Mar. 10, 1959 |
| 2,931,746 | Robitschek et al. | Apr. 5, 1960 |